United States Patent [19]
Milotich

[11] 3,819,053
[45] June 25, 1974

[54] WASTE TREATMENT SYSTEM
[75] Inventor: Francis J. Milotich, Broomall, Pa.
[73] Assignee: General Electric Company, New York, N.Y.
[22] Filed: Oct. 2, 1972
[21] Appl. No.: 294,028

[52] U.S. Cl. ...210/108, 210/111, 210/112, 210/195, 210/196, 210/304, 210/335, 210/477, 210/512
[51] Int. Cl........................ B01d 21/26, B01d 29/04
[58] Field of Search.... 210/108, 111, 112, 194–196, 210/152, 252, 257, 258, 512, 96, 335, 477, 304

[56] References Cited
UNITED STATES PATENTS
| | | | |
|---|---|---|---|
| 2,840,524 | 6/1958 | Stavenger et al. | 210/108 UX |
| 2,982,412 | 5/1961 | Hirs | 210/111 X |
| 3,283,803 | 11/1966 | Phillips, Jr. et al. | 210/68 X |
| 3,408,288 | 10/1968 | Messa | 210/195 X |
| 3,485,369 | 12/1969 | Voorheis | 210/108 |

Primary Examiner—Samih N. Zaharna
Assistant Examiner—Robert H. Spitzer

[57] ABSTRACT

Sewage which has been ground, macerated, and treated with a coagulant is introduced at the bottom of a solids separating tank. Solids accumulate in a sludge blanket below a screen dividing the tank into upper and lower portions, while clear liquid passes through the blanket and screen. Sludge from the sludge blanket is pumped to a sludge concentrating tank where further liquid is extracted. The concentrated sludge is periodically pumped out for incineration or other disposal.

4 Claims, 1 Drawing Figure

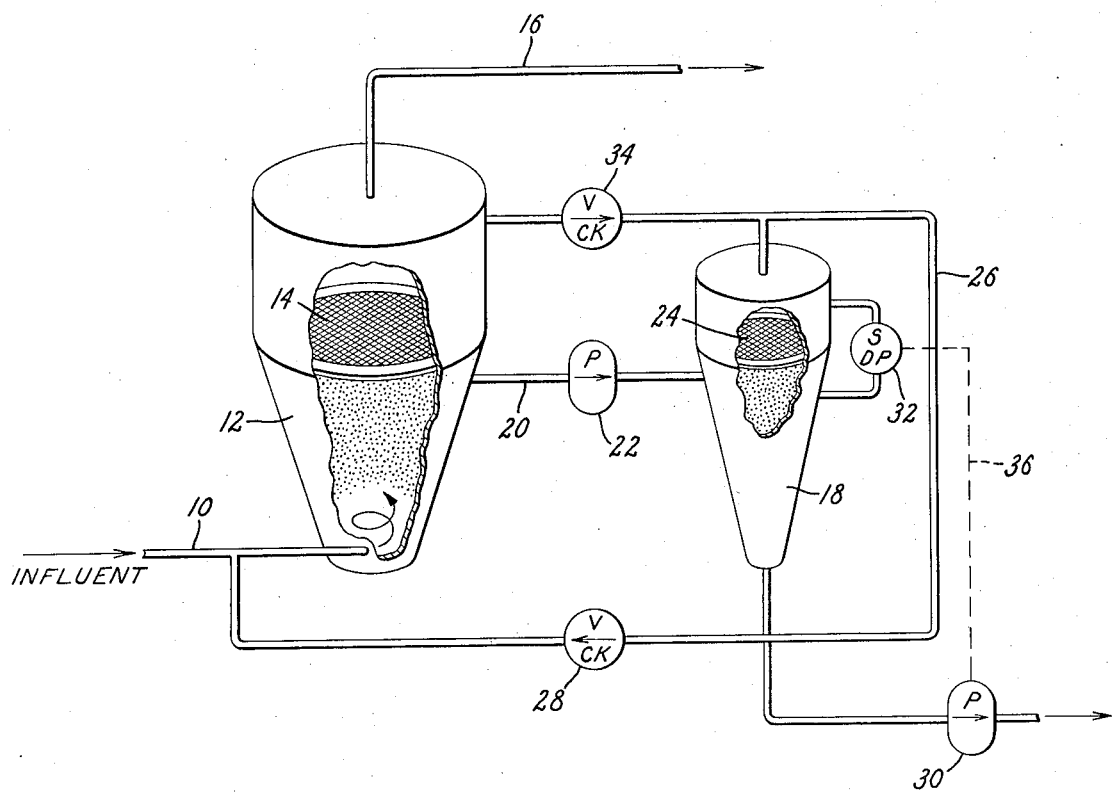

WASTE TREATMENT SYSTEM

BACKGROUND OF THE INVENTION

This invention relates generally to waste treatment systems and more particularly to the separation and concentration of the solids in a macerated sludge for disposal by incineration or other means.

Typically, wastes generated aboard a ship, including culinary and human wastes, have been disposed of by dumping overboard. Efforts to curb pollution have created a need for processes and equipment for nonpolluting disposition. The general techniques for sewage treatment, particularly in land based systems, are well known, and typically involve grinding and macerating solids, coagulation of solid particles, separation of the solids and liquids, and treatment of the liquids. M. A. Messa in U.S. Pat. No. 3,408,288 discloses apparatus for treatment of waste water, but only indicates that solids may be dipped out of the sludge chamber.

A need exists consequently, for improved separation and concentration of solids contained in a macerated sludge.

SUMMARY OF THE INVENTION

In a preferred form of the invention, ground and macerated sewage which has been treated with a coagulant is tangentially introduced near the bottom of a solids separating tank. A sludge blanket is formed below a screen while clear liquid passes through. Sludge is pumped from the blanket to a sludge concentrating tank where further liquid is removed passing through a screen. Concentrated sludge is periodically pumped out of the tank, while at the same time the screen is back flushed.

BRIEF DESCRIPTION OF THE DRAWINGS

The FIGURE shows schematically one embodiment of a waste treatment system in accordance with the invention.

DESCRIPTION OF THE PREFERRED EMBODIMENT

Sewage in which the solids have been ground, macerated and passed through an electrocoagulation cell or treated with a coagulant to produce pin floc are received through line 10 and delivered to the lower portion of solids separating tank 12. As shown, the pin floc waste enters tank 12 tangentially near the base of the conical lower portion. The resulting swirling motion enhances collisions between sludge particles and the pin floc causing conglomeration. The conical configuration of the lower portion of solids separating tank 12 provides an increased cross-sectional area as the mixture rises with a commensurate reduction in upward velocity. This minimizes disturbance of the sludge blanket which is formed.

Screen 14 separates the lower and upper portions of solids separating tank 12. The screen 14 provides a distinct interface between the sludge blanket and the clear liquid to minimize dispersion of the sludge blanket. For a particular influent flow rate a screen size is selected so that the upward flow velocity is less than the settling velocity of suspended particles and pin floc, thereby maintaining sludge blanket formation below the screen. Clear liquid emerges upwardly through the screen to be discharged through line 16 for further treatment by chlorination or the like.

As sludge accumulates below screen 14 it is transferred to the lower portion of sludge concentrating tank 18 via line 20 by pump 22. Pump 22 operates independently of the influent flow rate to tank 12.

Screen 24 acts as a filter, retaining solids in the lower portion of tank 18 while permitting liquid to pass to the upper portion. Liquid from the upper portion of tank 18 is recirculated via line 26 and check valve 28 to the lower portion of solids separating tank 12. Pump 30 is provided to remove concentrated solids from sludge concentrating tank 18 and transfer them to a storage tank or incinerator. Pump 30 may operate only for short periods on a regular cycle. In addition, differential pressure sensor 32 may be employed to measure the pressure drop across screen 24 and the sludge layer below it. If the pressure drop becomes excessive, additional operation of pump 30 will achieve a reduction. Start and stop signals may be delivered from sensor 32 to pump 30 over line 36.

During operation of pump 30 more material is removed from sludge concentrating tank 18 than is being introduced by pump 22. Consequently clear liquid from the upper portion of solids separating tank 12 is drawn through check valve 34 into the upper portion of tank 18. Liquid in the upper portion of tank 18 is drawn down through screen 24, flushing it.

The system described has the advantage of providing a continuous flow operation and is automatic. It has particular utility in a shipboard operation since screens 14 and 24 prevent breakup of the sludge blanket which might otherwise be caused by rolling and pitching of the ship.

While a particular embodiment of a waste treatment system has been illustrated and described, it will be obvious that changes and modifications can be made without departing from the spirit of the invention and the scope of the appended claims.

What is claimed is:

1. An improved system for the separation and concentration of the solids contained in macerated sewage from the liquid comprising:
   a solids separating tank having an inlet near the bottom;
   solids retaining means dividing said solids separating tank into upper and lower portions for retaining solids in the lower portion while permitting liquid to pass to the upper portion;
   a sludge concentrating tank;
   solids retaining means dividing said sludge concentrating tank into upper and lower portions for retaining solids in the lower portion while permitting liquid to pass to the upper portion;
   means for removing clarified liquid from the upper portion of said solids separating tank;
   means for transferring sludge from the lower portion of said solids separating tank to the lower portion of said sludge concentrating tank;
   removal means for pumping concentrated solids from the lower portion of said sludge concentrating tank;
   control means responsive to a pressure drop between said upper and lower portions of said sludge concentrating tank greater than a predetermined amount for actuating said removal means; and back flushing means for flushing said solids retaining means in said sludge concentrating tank when said removal means operates.

2. A system in accordance with claim 1 further including:
means for recirculating liquid from the upper portion of said sludge concentrating tank to the lower portion of said solids separating tank.

3. A system in accordance with claim 1 wherein:
the lower portion of said solids separating tank is a right circular frustrum having its smallest diameter at the bottom.

4. A system in accordance with claim 3 wherein:
the inlet to said solids separating tank is arranged to introduce influent tangentially.

* * * * *